US009024917B2

(12) United States Patent
 Eriksson et al.

(10) Patent No.: US 9,024,917 B2
(45) Date of Patent: May 5, 2015

(54) SIDE-LIGHT DISPLAY ILLUMINATOR

(71) Applicant: Neonode Inc., Santa Clara, CA (US)

(72) Inventors: Thomas Eriksson, Stocksund (SE);
 Lars Sparf, Vällingby (SE); Björn Magnus Jacobsson Le Normand, Stockholm (SE)

(73) Assignee: Neonode Inc., Santa Clara, CA (US)

( * ) Notice: Subject to any disclaimer, the term of this patent is extended or adjusted under 35 U.S.C. 154(b) by 29 days.

(21) Appl. No.: 13/791,980

(22) Filed: Mar. 9, 2013

(65) Prior Publication Data
 US 2013/0241886 A1  Sep. 19, 2013

Related U.S. Application Data

(60) Provisional application No. 61/609,956, filed on Mar. 13, 2012.

(51) Int. Cl.
 *G06F 3/042* (2006.01)
 *G02F 1/1335* (2006.01)
 *G09F 13/04* (2006.01)
 *G09G 3/36* (2006.01)
 *F21V 8/00* (2006.01)

(52) U.S. Cl.
 CPC ............ *G02B 6/0091* (2013.01); *G06F 3/0421* (2013.01); *G02B 6/0075* (2013.01); *G06F 3/042* (2013.01); *G02B 6/0018* (2013.01); *G02B 6/002* (2013.01)

(58) Field of Classification Search
 CPC .. G06F 3/0421; G06F 3/0428; G02F 1/13338
 USPC ......................... 345/173, 175–178, 102, 104; 178/18.01–20.04; 349/60–63; 362/97.3–97.4
 See application file for complete search history.

(56) References Cited

U.S. PATENT DOCUMENTS

| | | | |
|---|---|---|---|
| 7,026,567 B2 * | 4/2006 | Mai et al. ..................... | 200/512 |
| 7,098,894 B2 * | 8/2006 | Yang et al. ................... | 345/166 |
| 2008/0278460 A1 | 11/2008 | Arnett et al. | |
| 2011/0032214 A1 * | 2/2011 | Gruhlke et al. .............. | 345/175 |
| 2011/0043490 A1 * | 2/2011 | Powell et al. ................ | 345/176 |
| 2011/0157097 A1 * | 6/2011 | Hamada et al. .............. | 345/175 |
| 2011/0163998 A1 | 7/2011 | Goertz et al. | |
| 2011/0210946 A1 | 9/2011 | Goertz et al. | |

* cited by examiner

OTHER PUBLICATIONS

Heater, B., "Amazon Kindle Paperwhite review", Engadget.com, Sep. 30, 2012. http://www.engadget.com/2012/09/30/amazon-kindle-paperwhite-review/.

*Primary Examiner* — Lun-Yi Lao
*Assistant Examiner* — Jarurat Suteerawongsa
(74) *Attorney, Agent, or Firm* — Soquel Group LLC

(57) ABSTRACT

A light guide for illuminating a display screen, including a vertical cone-shaped entrance surface including an aperture for admitting light beams emitted by an LED, a folding mirror for reflecting the admitted light beams at an angle of approximately 90°, and for horizontally collimating the admitted light beams, a horizontal guide for guiding the reflected light beams to an exit surface, and an exit surface positioned above a perimeter of a display screen for directing the guided light towards a portion of the display screen, the exit surface being tilted vertically from the horizontal at a slight angle to direct the guided light beams towards the display, and being shaped horizontally as a concave lens to spread the guided light beams horizontally over an angular expanse of the display screen.

7 Claims, 13 Drawing Sheets

SIDE-LIGHT DISPLAY ILLUMINATOR

CROSS REFERENCES TO RELATED APPLICATIONS

This application claims priority benefit of U.S. Provisional Patent Application Ser. No. 61/609,956, entitled SIDE-LIGHT DISPLAY ILLUMINATOR, filed on Mar. 13, 2012 by inventors Thomas Eriksson, Lars Sparf and Björn Le Normand, the contents of which are hereby incorporated herein in their entirety.

FIELD OF THE INVENTION

The field of the present invention is illuminators for displays of electronic devices.

BACKGROUND OF THE INVENTION

Conventional computer displays are illuminated by back lights underneath the display. As computing devices become ever more pervasive, adults and even children, work with computer displays for hours on end, often for the greater part of each day.

Excessive exposure to backlit displays may cause fatigue and may impair eyesight.

It would thus be of advantage to provide displays that are illuminated by sources other than back lights.

SUMMARY

Aspects of the present invention relate to display screens of electronic devices that are illuminated by side lights, instead of by back lights.

There is thus provided in accordance with an embodiment of the present invention a light guide for illuminating a display screen, including a vertical cone-shaped entrance surface including an aperture for admitting light beams emitted by an LED, a folding mirror for reflecting the admitted light beams at an angle of approximately 90°, and for horizontally collimating the admitted light beams, a horizontal guide for guiding the reflected light beams to an exit surface, and an exit surface positioned above a perimeter of a display screen for directing the guided light towards a portion of the display screen, the exit surface being tilted vertically from the horizontal at a slight angle to direct the guided light beams towards the display, and being shaped horizontally as a concave lens to spread the guided light beams horizontally over an angular expanse of the display screen.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to display screens of electronic devices that are illuminated via light guides by side lights positioned near the perimeters of the display screens.

Figure 1:
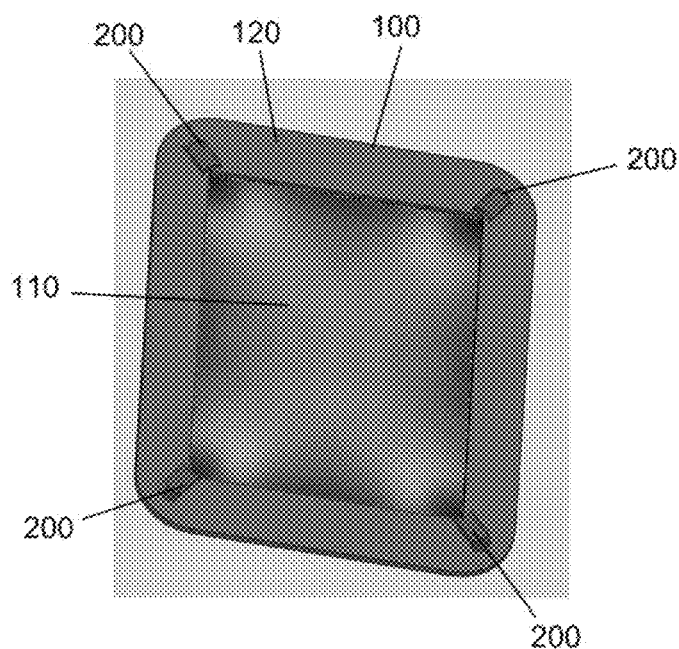
FIG. 1 is a top view of an electronic device with a display screen that is illuminated by light transmitted through light guides positioned at the four corners of the display screen, in accordance with an embodiment of the present invention.

Reference is made to FIG. 1, which is a top view of an electronic device 100 with a display screen 110 that is illuminated by light transmitted through light guides 200 positioned at the four corners of the display, in accordance with an embodiment of the present invention. A casing 120 surrounds the perimeter of display screen 110.

Figure 2:
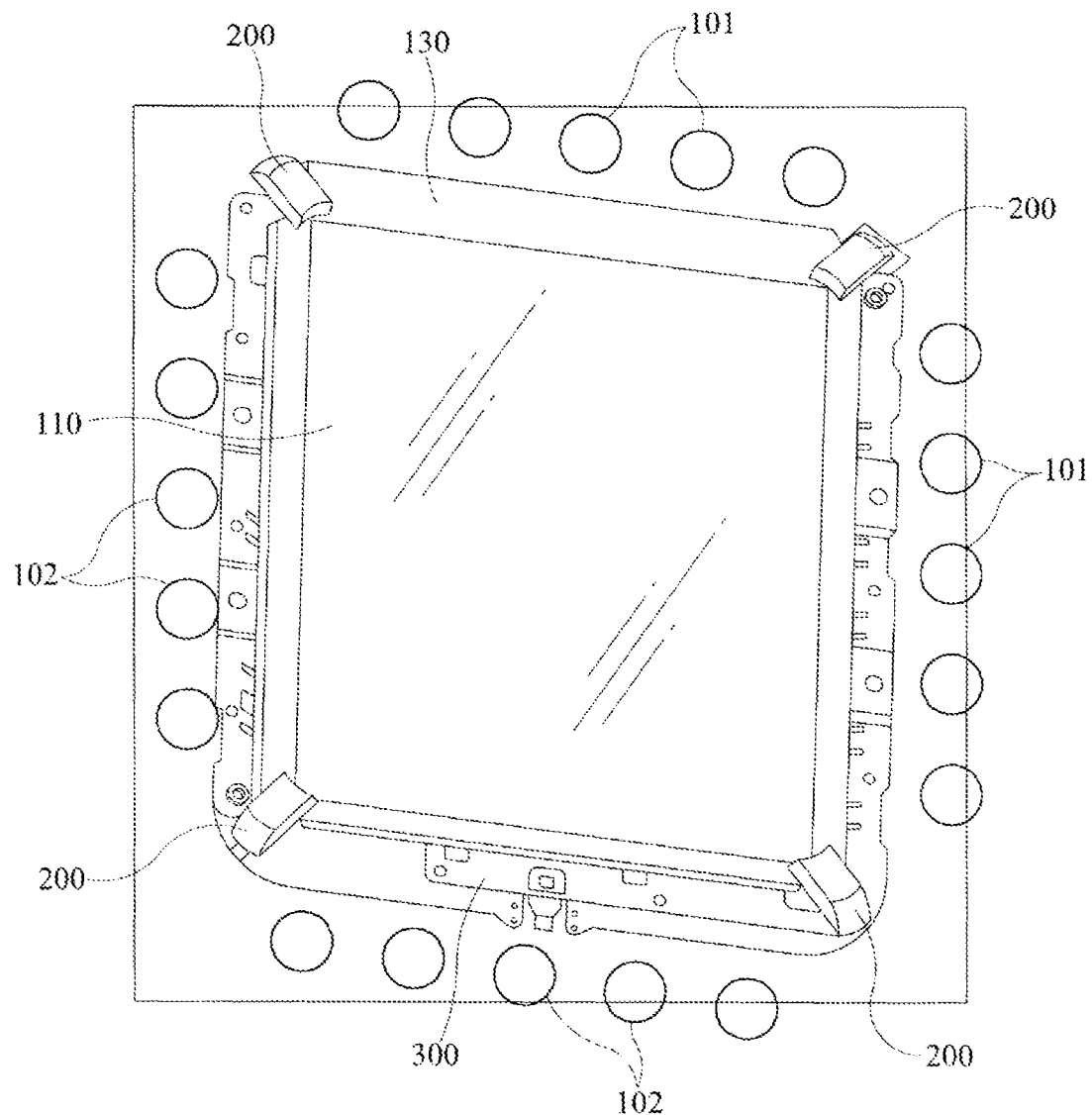
FIG. 2 is an exposed top view of the electronic device shown in FIG. 1 with the peripheral casing removed, in accordance with an embodiment of the present invention.

Reference is made to FIG. 2, which is an exposed top view of electronic device 100 with peripheral casing 120 removed, in accordance with an embodiment of the present invention. FIG. 2 shows a printed circuit board 300 on which the circuitry for display screen 110 is mounted.

FIG. 2 also shows a projector 130, which is used in an embodiment of the present invention in which display screen 110 is a touch-sensitive display screen. In this embodiment, a plurality of infrared light emitters 101, for emitting infrared light, are provided near the perimeter of display screen 110, and a plurality of infrared light receivers 102, for receiving infrared light emitted by the infrared light emitters, are provided near the perimeter of display screen 110. Projector 130 projects the infrared light emitted by the infrared light emitters across display screen 110 in order to enable detection of touch position when an object touches display screen 110. Use of infrared emitters and infrared receivers for providing touch detection is described in assignee's U.S. Pat. No. 8,339,379 entitled LIGHT-BASED TOUCH SCREEN, the contents of which are hereby incorporated in their entirety.

Figure 3:
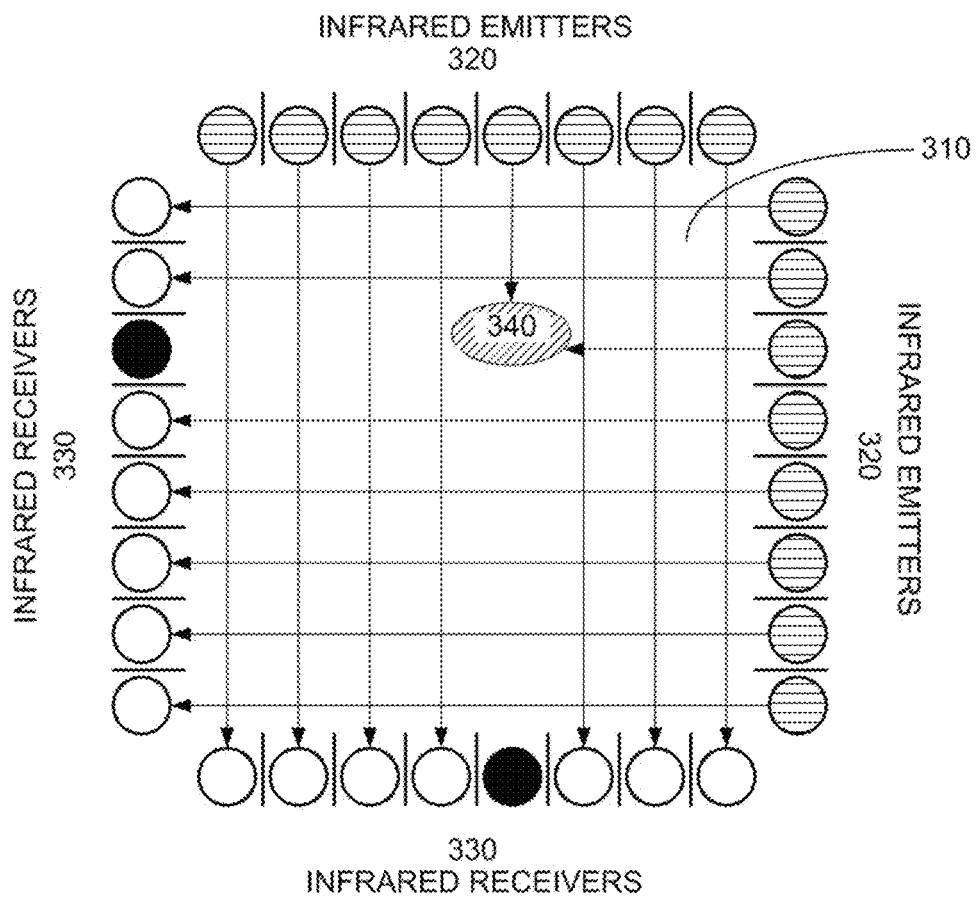
FIG. 3 is an illustration of a prior art light-based touch screen.

Light-based touch screens operate by emitting light beams across a touch screen from two adjacent edges, and detecting whether the light beams are blocked from reaching detectors at the two opposite edges. Reference is made to FIG. 3, which is an illustration of a prior art light-based touch screen. FIG. 3 shows infrared light emitters 320, which emit infrared light, aligned along two adjacent edges of a display 310. Across from light emitters 320 are corresponding infrared light receivers 330, which receive the infrared light emitted by emitters 320. However, when an object 340 touches display 310, it blocks light emitted by one or more specific emitters 320 from reaching their corresponding specific receivers 330. As such, object 340 is detected when light is not detected by the specific receivers 330. Since infrared receivers 330 are arranged along two dimensions of display 310, the blocked receivers on each edge suffice to determine the spatial location of object 340 on display 310.

It will be appreciated from FIG. 3 that the corners of display 310 are vacant of emitters and receivers, and thus provide an opportune location for placement of side light illuminators.

Figure 4:
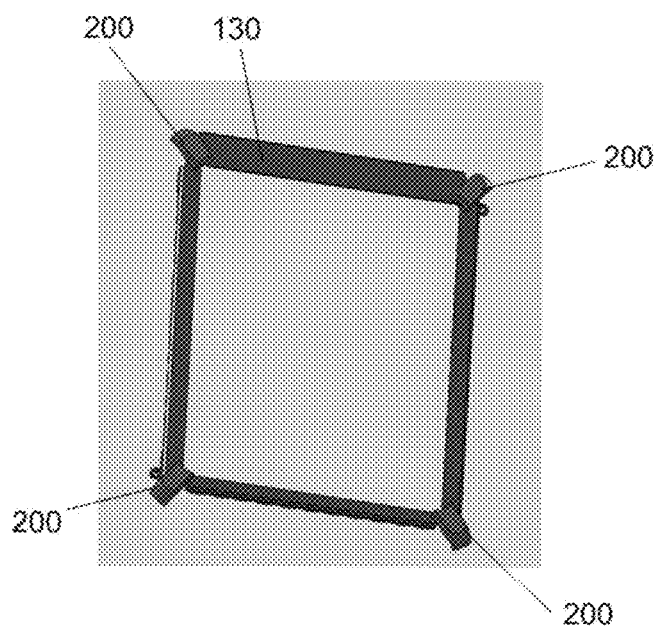
FIG. 4 is a top view of the outer frame of the electronic device shown in FIG. 1, in accordance with an embodiment of the present invention.

Reference is made to FIG. 4, which is a top view of the outer frame of electronic device 100, in accordance with an embodiment of the present invention.

Figure 5:
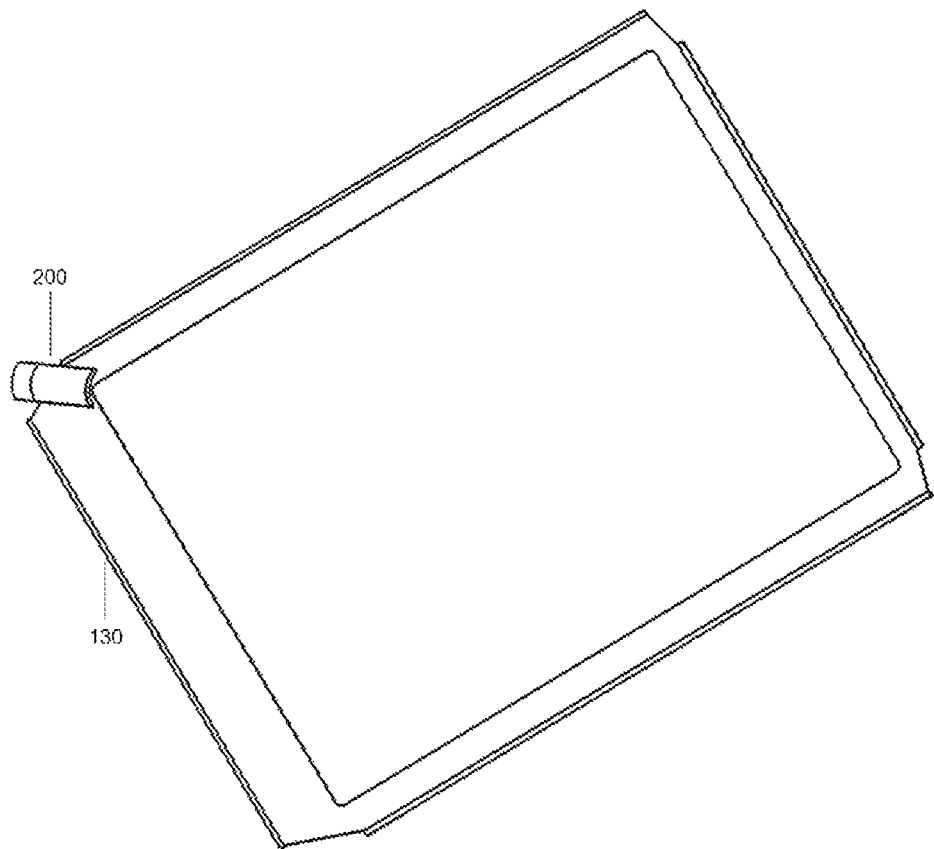
FIG. 5 is a top view of the outer frame of the electronic device shown in FIG. 1 showing one of the light guides positioned at a corner of the display screen, in accordance with an embodiment of the present invention.

Reference is made to FIG. 5, which is a top view of the outer frame of electronic device 100 showing one of the light guides 200 positioned at a corner of display screen 110, in accordance with an embodiment of the present invention.

Figure 6:
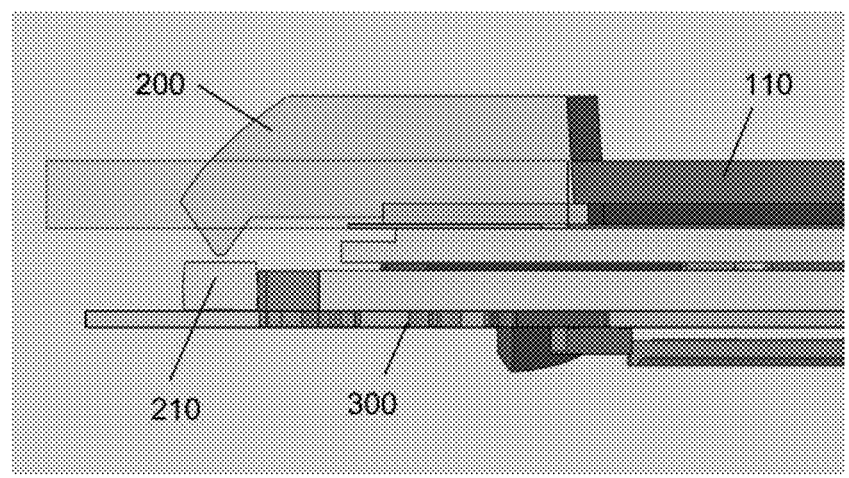
FIG. 6 is a simplified illustration of a light guide for transmitting light to illuminate a portion of a display screen, in accordance with an embodiment of the present invention.

Reference is made to FIG. 6, which is a simplified illustration of a light guide 200 for transmitting light to illuminate a portion of a display screen 110, in accordance with an embodiment of the present invention. FIG. 6 shows an LED 210 that emits light beams into an aperture at the entrance of light guide 200, mounted on printed circuit board 300.

Figure 7:
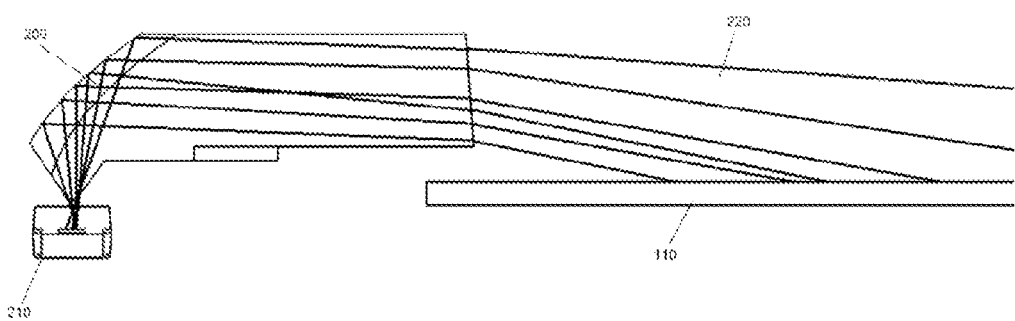
FIG. 7 is a simplified vertical cross-sectional view of light beams transmitted through a light guide for illuminating a portion of a display screen, in accordance with an embodiment of the present invention.

Reference is made to FIG. 7, which is a simplified vertical cross-sectional view of light beams 220 transmitted through a light guide 200 for illuminating a portion of display screen 110, in accordance with an embodiment of the present invention. Light beams 220 are emitted by LED 210 into an entrance surface of light guide 200. The exit surface of light guide 200 is tilted slightly downward so as to aim the central light beams at a location on display screen 110 somewhere between 25%-50% along the extent of display screen 110.

Figure 8:
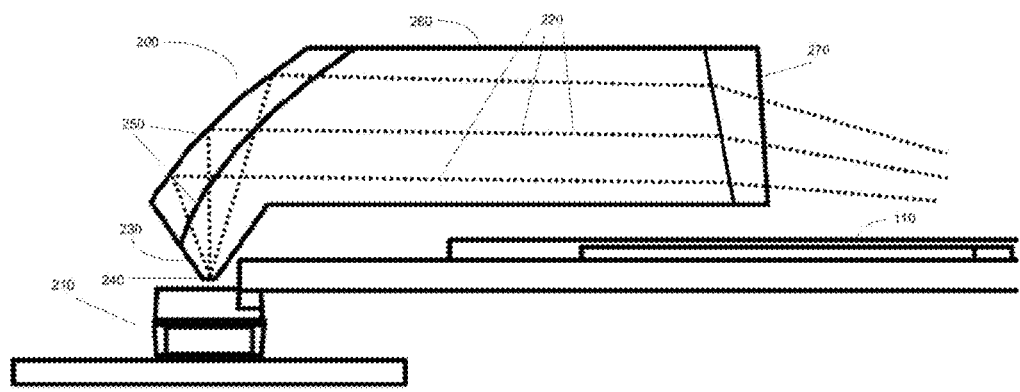
FIG. 8 is a simplified vertical cross-sectional view of a light guide transmitting light beams to illuminate a portion of a display screen, in accordance with an embodiment of the present invention.

Reference is made to FIG. 8, which is a simplified vertical cross-sectional view of a light guide 200 transmitting light beams 220 to illuminate a portion of display screen 110, in accordance with an embodiment of the present invention. As seen in FIG. 8, light guide 200 has a vertical cone-shaped entrance surface 230 with an aperture 240 for admitting light beams emitted by LED 210. Light guide 200 has a folding mirror 250 for reflecting the admitted light beams at an angle of approximately 90°. Light guide 200 has a horizontal guide portion 260 for guiding the reflected light beams to an exit surface 270 positioned above a perimeter of a display screen. Exit surface 270 is tilted vertically from the horizontal at a slight angle, to direct the guided light beams towards the surface of display screen 110. In other words, the exit surface is not perpendicular to the screen surface in order to direct light beams onto the screen surface.

Figure 9:
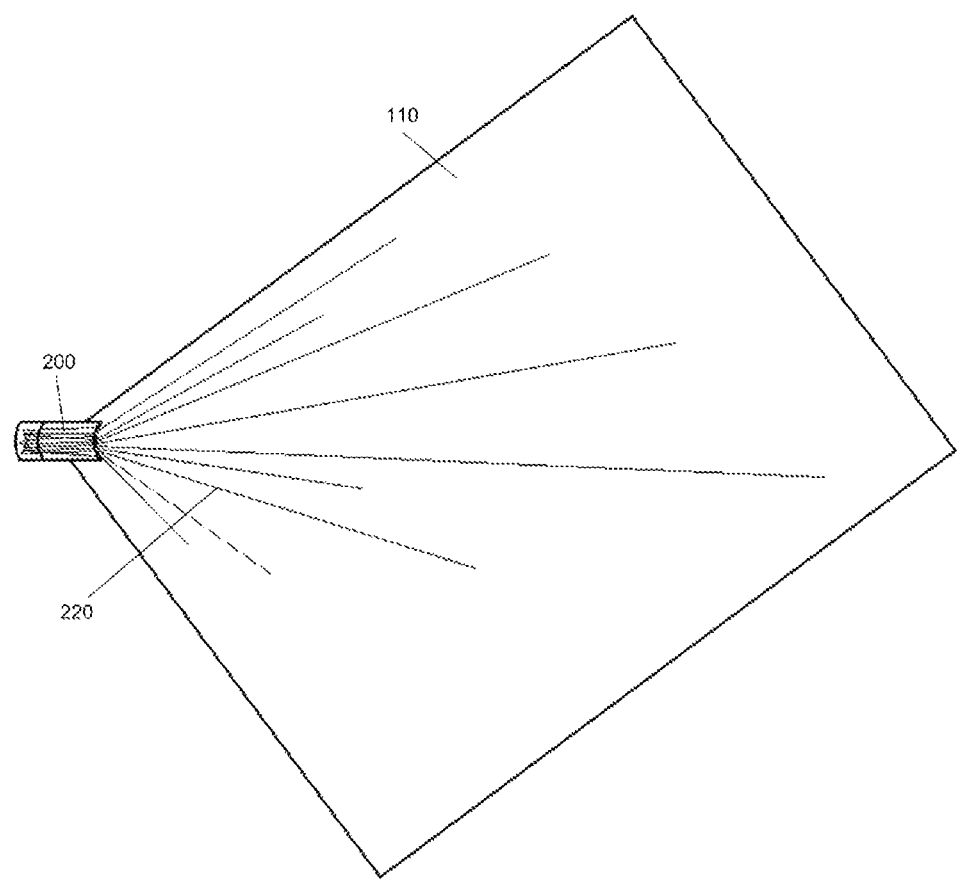
FIG. 9 is a simplified horizontal cross-sectional view of light beams transmitted through a light guide for illuminating a portion of a display screen, in accordance with an embodiment of the present invention.

Reference is made to FIG. 9, which is a simplified horizontal cross-sectional view of light beams 220 transmitted through a light guide 200 for illuminating a portion of display screen 110, in accordance with an embodiment of the present invention.

Figure 10:
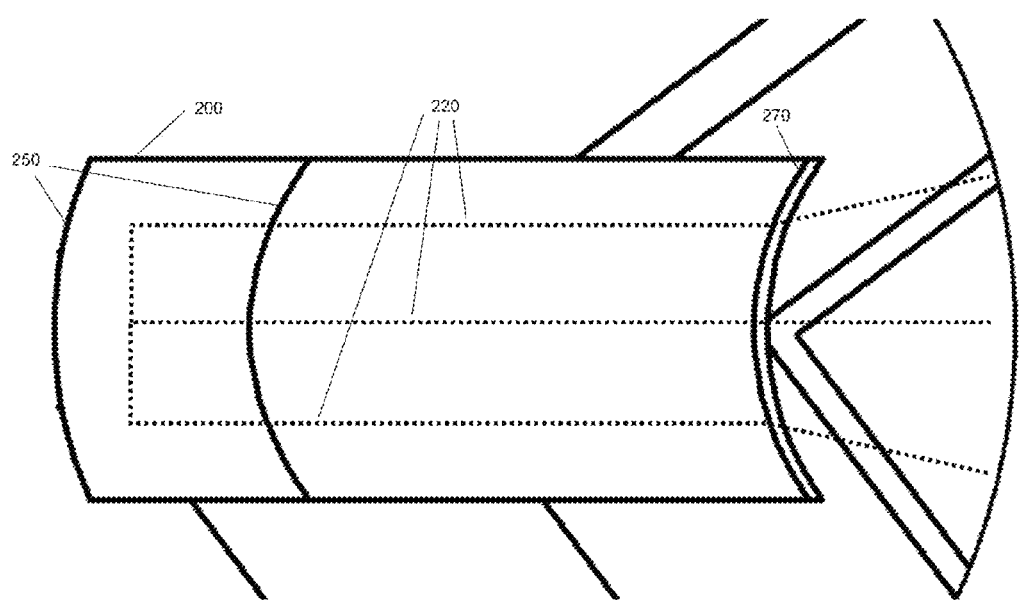
FIG. 10 is a simplified horizontal cross-sectional view of a light guide transmitting light beams to illuminate a portion of a display screen, in accordance with an embodiment of the present invention.

Reference is made to FIG. 10, which is a simplified horizontal cross-sectional view of a light guide 200 transmitting light beams 220 to illuminate a portion of display screen 110, in accordance with an embodiment of the present invention. As seen in FIG. 10, folding mirror 250 horizontally collimates the light beams 220 emitted at the center of LED 210 (not shown in FIG. 10). As further seen in FIG. 10, exit surface 270 is shaped horizontally as a concave lens, and spreads the guided light beams horizontally over an angular expanse of display screen 110.

Figure 11:
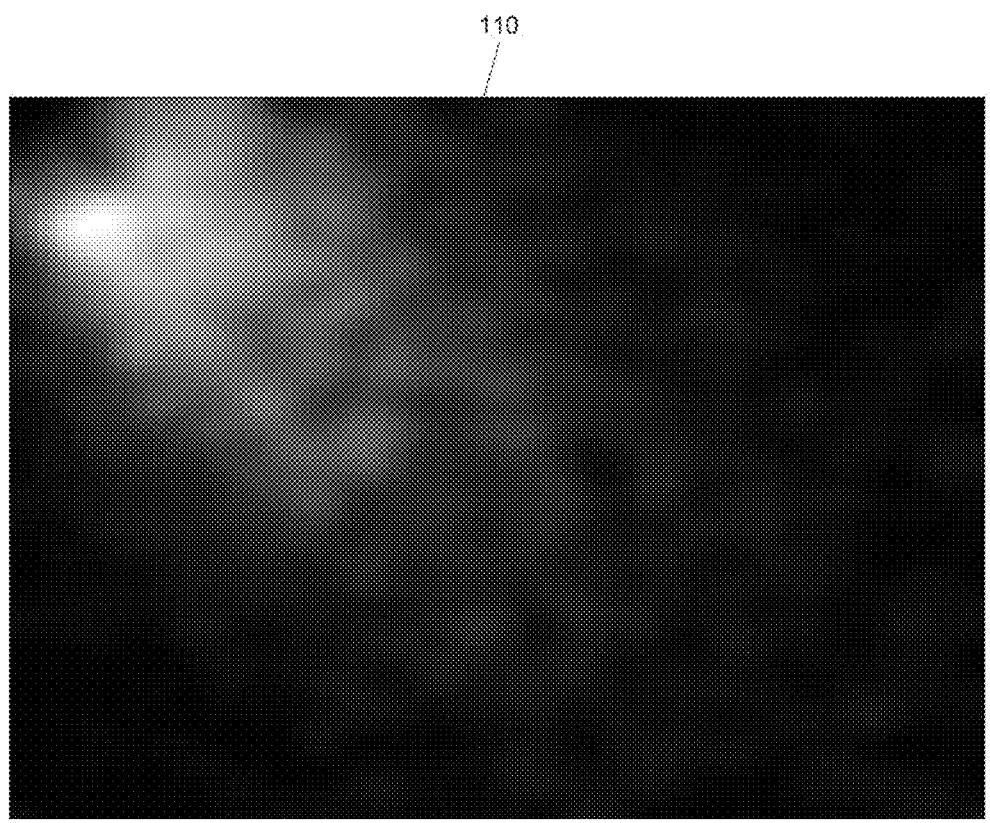
FIG. 11 is an illustration of an illumination pattern produced by light transmitted through a single light guide positioned at a corner of a display screen, in accordance with an embodiment of the present invention.

Reference is made to FIG. 11, which is an illustration of an illumination pattern produced by light transmitted through a single light guide 200 positioned at a corner of a display screen 110, in accordance with an embodiment of the present invention. As seen in FIG. 11, the light transmitted through light guide 200 effectively illuminates one quadrant of display screen 110. Use of four light guides 200, one light guide at each corner of display screen 110, effectively illuminates the entire display screen.

Construction of Light Guides 200

Regarding the amount of illumination, four LEDs, each having luminous flux of 7 lm, suffice to illuminate a display screen of dimensions 120 mm×90 mm for reading. Williams, "Footcandles and Lux for Architectural Lighting", http://www.mts.net/~william5/library/illum.htm, recommends a luminance of 300-500 lx for reading. As such, the flux needed for a 120 mm×90 mm reading surface is at most 500 lx**0.11 $m^2$=5.5 lm. Assuming a 20% illumination efficiency, four LEDs each having luminous flux of 7 lm provide 0.2*4*7 lm=5.6 lm, which is sufficient for reading. LEDs with illumination of 7 lm are commercially available.

Regarding the distribution of the illumination, it is of advantage to design the four light guides 200 so as to provide uniform illumination of display screen 110, instead of over-illuminating some portions and under-illuminating others. Moreover, it is important that the center of display screen 110 be well-illuminated, since this is the critical portion of the display. Distribution of illumination is characterized by "étendue", which is defined as the area of the entrance pupil times the solid angle a source subtends as seen from the pupil, http://en.wikipedia.org/wiki/Etendue. The étendue is conserved as light travels through free space, and is conserved at refractions or reflections. When light passes through an optical system, the étendue does not increase; it is either conserved or reduced.

Figure 12:
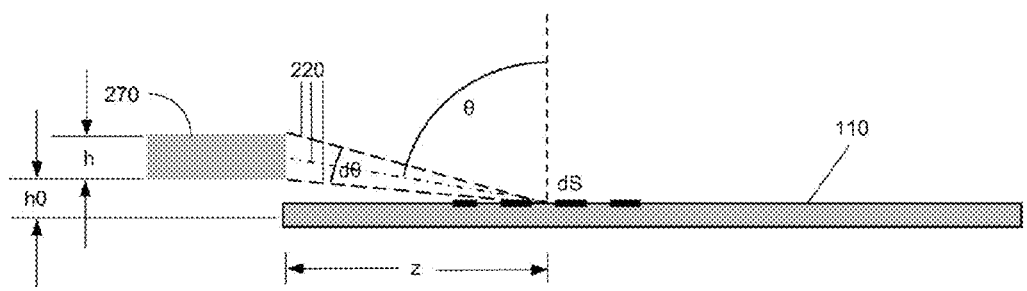
FIG. 12 is a simplified illustration of distribution of illumination via a light guide over the surface of a display screen, in accordance with an embodiment of the present invention.

Reference is made to FIG. 12, which is a simplified illustration of distribution of illumination via a light guide over the surface of a display screen, in accordance with an embodiment of the present invention. FIG. 12 shows light transmitted from exit surface 270 of light guide 200 illuminating a differential element dS of display screen 110, in accordance with an embodiment of the present invention. In terms of the dimensions h, $h_0$ and z shown in FIG. 12, the étendue, dG, for the surface area at dS is determined as follows:

$$d\theta \approx \frac{h \cdot z}{z^2 + \left(\frac{h}{2} + h_0\right)^2}, \quad (1)$$

$$\cos(\theta) = \frac{\frac{h}{2} + h_0}{\sqrt{z^2 + \left(\frac{h}{2} + h_0\right)^2}}, \quad (2)$$

$$dG = d\theta \cdot \cos(\theta) \cdot dS \approx \frac{h \cdot z \cdot \left(\frac{h}{2} + h_0\right)}{\left[z^2 + \left(\frac{h}{2} + h_0\right)^2\right]^{\frac{3}{2}}} dS. \quad (3)$$

For one embodiment of the present invention, h=4 mm, $h_0$=0.9 mm and z ranges from 2 mm-160 mm along the diagonal from the corner at which light guide 200 is located to the opposite corner.

Figure 13:
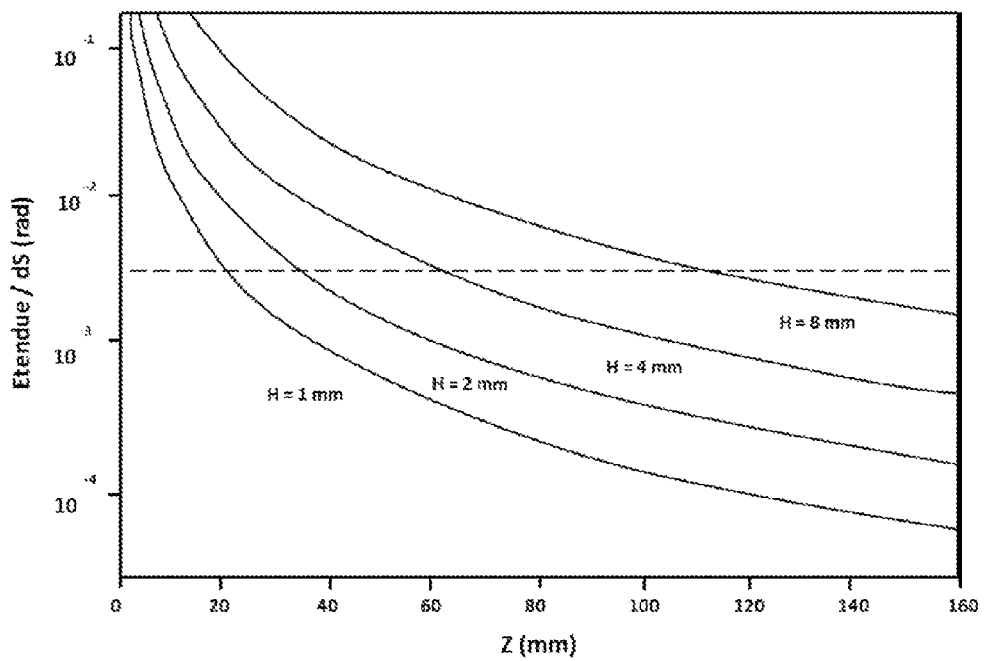
FIG. 13 is a log plot of étendue/dS (in radians) for a display screen illuminated by a light guide, vs. z (in mm), for each of four light guide height parameter values, in accordance with an embodiment of the present invention.

Reference is made to FIG. 13, which shows four log plots of étendue/dS (in radians) vs. z (in mm), corresponding to values of h=1 mm, 2 mm, 4 mm and 8 mm and $h_0$=0.9 mm, derived from EQS. (1)-(3).

The total illumination is limited by the one-dimensional étendue of LED 210, which has a size of 2 mm and a spread angle of 90°; namely, G=($\pi$/2 rad)*(2 mm)≈3 mm-rad. Assuming the étendue is limited by light guide entrance 230 to a 30° angle and 1 mm size, then the maximum illumination is $G_{max}$=0.5 mm-rad. The dashed line in FIG. 13 shows the corresponding uniform illumination that such an LED can generate, where étendue/dS=$G_{max}$/160 mm=0.003 rad, over the full 160 mm extent of the range of z.

Considering FIG. 13, two cases for limitation of the illumination of the display are identified. For low values of z, the étendue/dS is higher than the light provided from the LED (dashed curve), which means that the LED is a limiting factor and all light received by the light guide can in principle be used. However, for high values of z where the étendue/dS is below the dashed line (e.g., at z>60 mm for h=4 mm), the geometry of the illumination of the screen, as shown in FIG. 12, limits the maximum illumination possible; i.e., not all light of the LED can be used due to the étendue limitation. Thus, a design objective is to illuminate over the 25% to 50% range of the abscissa. As an example, for h=4 mm, the integrated étendue for z=38 mm to 76 mm is 0.15 mm-rad, as compared to the LED étendue, $G_{max}$. Since the value of the display étendue is still lower than the LED étendue, the light guide entrance surface limited size, e.g., 1 mm, and acceptance angle, e.g., 30°, do not limit the achievable illumination.

Advantages of the Construction of Light Guides 200

As explained above, light guides 200 are constructed so as to achieve strong illumination towards the center of the display screen, away from the light guide exit surfaces 270.

Aperture 240 in entrance surface 230 blocks light that originates off-center of LED 210, which serves to reduce unnecessary excess illumination close to exit surface 270. Generally, the size of the light emitting area of LED 210 is larger than the opening of aperture 240 and, as such, movements of aperture 240 relative to the emitting area of LED 210 do not impact performance.

The cone shape of entrance surface 230 reduces the interference from light not passing through aperture 240, and thus increases the efficiency of aperture 240.

The downward tilt of exit surface 270 reduces demand on folding mirror 250, since folding mirror 250 may be used at larger angle of incidence which, in turn, gives a larger margin to the limit of total internal reflection.

The upper and lower walls of horizontal guide 260 are painted black, in order to absorb light beams at the floor and ceiling of horizontal light guide 260 and thereby eliminate or reduce undesired reflections. Indeed, reflection of light at the upper and lower walls of horizontal guide 260 generates light in undesired directions, with excess illumination near the corner of the display screen at which light guide 200 is positioned.

The side walls of horizontal guide 260 are used to reflect light horizontally, which increases utilization of the light beams, and improves the horizontal spread of the light beams emerging from exit surface 270.

Folding mirror 250 horizontally collimates light beams emitted from the center of LED 210. The off-center light beams emitted by LED 210 are also approximately horizontally collimated by folding mirror 250, but with a different angle of propagation than the on-center light beams. In turn, this causes the desired horizontal spread of light over the display screen.

The horizontal cross-sectional shape of exit surface 270 as a concave lens serves to provide an approximately 90° spread angle for the light beams emerging from exit surface 270.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A light guide for illuminating a display screen, comprising:
   a vertical cone-shaped entrance surface comprising an aperture for admitting light beams emitted by an LED;
   a folding mirror for reflecting the admitted light beams at an angle of approximately 90°, and for horizontally collimating the admitted light beams;
   a horizontal guide for guiding the reflected light beams to an exit surface; and
   the exit surface positioned above a perimeter of a display screen for directing the guided light towards a portion of the display screen, the exit surface being tilted vertically from the horizontal at a slight angle to direct the guided light beams towards the display and to illuminate a displayed image, and being shaped horizontally as a concave lens to spread the guided light beams horizontally over an angular expanse of the display screen.

2. The light guide of claim 1 wherein said horizontal guide comprises upper and lower walls that are painted black to absorb light and prevent internal reflections off of said upper and lower walls.

3. The light guide of claim 1 wherein said exit surface is tilted so as to direct a central light beam emitted by the LED to a location that is between 25% and 50% along the extent of the display screen.

4. The light guide of claim 1 wherein said exit surface is tilted at an angle of approximately 4°.

5. The light guide of claim 1 wherein said horizontal entrance surface, said horizontal guide and said exit surface are comprised of a plastic material.

6. A display for an electronic device, comprising:
   a rectangular display screen;
   four LEDs positioned near the four corners of said rectangular display screen;
   four light guides positioned near said four LEDs, each light guide comprising a light guide in accordance with claim 1, for transmitting light beams generated by said four LEDs over said rectangular display screen so as to illuminate said display screen.

7. The display of claim 6 further comprising:
- a plurality of infrared light emitters positioned near the perimeter of said rectangular display screen for emitting infrared light;
- a plurality of infrared light receivers positioned near the perimeter of said rectangular display screen, for receiving infrared light emitted by said infrared light emitters; and
- a projector mounted near the perimeter of said rectangular display screen for projecting the infrared light emitted by said infrared light emitters across said rectangular display screen in order to enable detection of a touch position when an object touches said rectangular display screen.

* * * * *